Jan. 18, 1944.    E. C. S. CLENCH ET AL    2,339,378
FLUID PRESSURE REGULATING DEVICE FOR FLUID SUPPLY SYSTEMS
Filed Dec. 19, 1941

INVENTORS
EDWARD C. S. CLENCH
QUINTIN H. CARLTON
BY
M. W. McConkey
ATTORNEY

Patented Jan. 18, 1944

2,339,378

UNITED STATES PATENT OFFICE 2,339,378

FLUID PRESSURE REGULATING DEVICE FOR FLUID SUPPLY SYSTEMS

Edward Claude Shakespeare Clench and Quintin Healey Carlton, Leamington Spa, England, assignors to Automotive Products Company Limited, Leamington Spa, England Application December 19, 1941, Serial No. 423,684
In Great Britain December 6, 1940

13 Claims. (Cl. 137—153)

This invention relates to pressure regulating devices and it has for its object to provide improvements in pressure regulating devices of the known kind (hereinafter mentioned as "the kind referred to") in which a blow-off valve is arranged to connect a constantly driven pump with a reservoir or vent when the pressure of the fluid which is normally delivered by said pump through a non-return valve to an accumulator or other device, reaches a predetermined value, the fluid pressure at that side of the non-return valve remote from the pump being arranged to hold the blow-off valve open until a predetermined reduction has occurred in the fluid pressure of the accumulator or equivalent.

In particular the invention enables the production of a pressure regulating device which is reliable in operation and is arranged so that the pressures at which the blow-off valve opens and closes respectively can be adjusted independently over relatively wide ranges. This, of course, is very convenient in practice, as it not only enables the maximum working pressure to be accurately set, but it also permits the regulating device to be adjusted so that the pump recommences charging the accumulator or equivalent when any predetermined pressure drop has occurred therein.

In a pressure regulating device of the kind referred to, according to the invention the blow-off valve is operated by a piston or like device through the medium of a lost motion connection, said piston device being urged in the valve-closing direction by a main spring, and in the opposite direction by an auxiliary spring acting in combination with the fluid pressure in the accumulator or equivalent, said auxiliary spring being arranged so that, when the blow-off valve is closed, said auxiliary spring ceases to exert force on the piston device before the latter moves the blow-off valve to its open position.

According to a feature of the invention in a pressure regulating device of the kind above referred to the blow-off valve device is connected with lost motion to a lever arranged to be resiliently urged away from a dead center position, the movement of said lever being brought about by a piston or like device which is acted upon by the fluid pressure in the accumulator or equivalent, and by a pair of springs acting in opposition, one of said springs having its range of action limited by a stop.

Preferably during movement of the piston or like device in its valve-opening direction, the auxiliary spring engages with a stop which removes from the piston device the force exerted by the said auxiliary spring. If desired the piston device may comprise a pair of pistons which are acted upon in the same direction by the fluid pressures of the pump delivery and of the accumulator or equivalent, respectively, that piston acted upon by the accumulator or equivalent pressure conveniently being smaller in cross-sectional area than the other piston. Preferably adjusting means are provided for varying the force which is exerted by the auxiliary spring, as variations in this force can be utilised for regulating the difference between the accumulator or equivalent pressure at which the blow-off valve closes and the corresponding but greater pressure at which the blow-off valve reopens.

If desired the piston device may be connected with an angularly movable arm, which latter is resiliently urged in either direction away from a central position, said arm being connected with the blow-off valve by a pin and slot connection. The blow-off valve can comprise a piston valve member which is resiliently located in its closed position by a spring loaded catch.

As a further feature of the invention there is provided a pressure regulating device of the kind referred to, comprising a body formed with a pair of mutually parallel bores, a piston device in one of said bores having a pair of pressure faces acted upon respectively by the pump delivery pressure, and the pressure in the accumulator or equivalent, an auxiliary spring urging said pistons in the same direction as the pressure fluid, a main spring urging the pistons in the opposite direction, an arm having resilient means by which it is urged in either direction away from a dead-center position, said arm being pivotally connected with the piston device, and also being connected, by means of a lost motion device, with a blow-off piston valve member disposed within the second bore in the body, the arrangement being such that only the final part of the movement of the arm is transmitted to the piston valve member, and that, when the arm is moving in the valve-opening direction the auxiliary spring engages a fixed stop before the valve is opened, thus removing the force of the auxiliary spring from the piston device, and delaying the opening of said valve.

The invention is illustrated by way of example in the accompanying drawing, in which.

Figure 1:
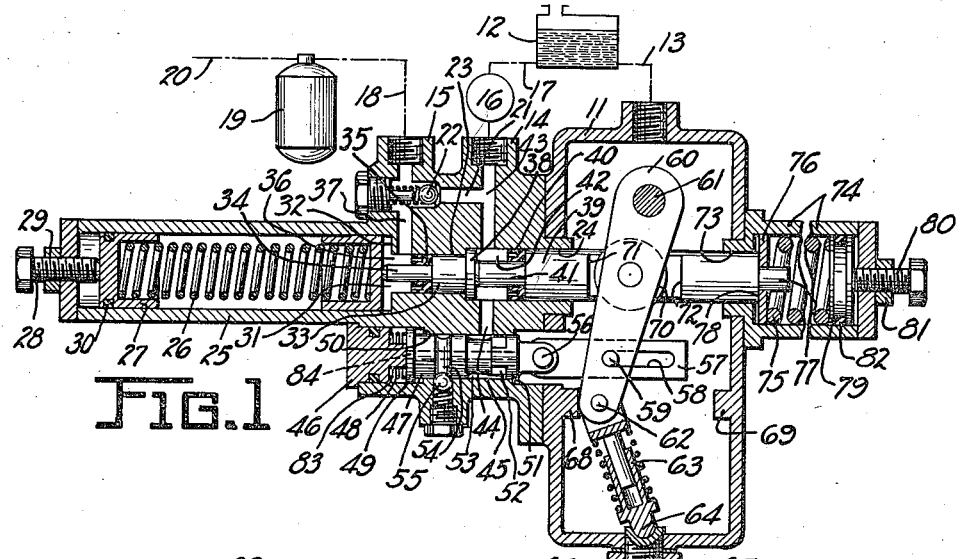
Figure 1 is a sectional elevation of one form of pressure regulating device, the associated parts of a typical fluid pressure system being shown diagrammatically to a reduced scale.

The pressure regulating device comprises a body 10 to which is attached a hollow casing 11, the interior of the latter being in permanent communication with a reservoir 12 by means of a pipe 13. The body 10 is formed with a pair of connections 14 and 15. The connection 14 is arranged to receive the pressure liquid which is delivered by a continuously running pump 16 fed from the reservoir 12 through a pipe 17; the connection 15 serves as an outlet for pressure liquid, which latter is fed through a pipe 18 to a hydraulic accumulator 19. The outlet from the accumulator 19 is indicated at 20 and is arranged to feed pressure liquid as required to a remote control or other hydraulic system (not shown). The connections 14 and 15 are placed in communication with one another by a passage 21 containing a non-return valve 22 adapted to permit pressure liquid to flow from the pump 16 to the accumulator 19, but not in the opposite direction.

The body 10 is formed with a bore constituted by a smaller diameter portion 23 and a larger diameter portion 24, a tubular housing 25 coaxial with the bore 23, 24 being arranged to accommodate an auxiliary spring 26. The outer end of this spring is in engagement with a cup-shaped slider 27 which is urged along the housing 25 by an adjusting set screw 28 having a lock nut 29, thus enabling the force exerted by the auxiliary spring 26 to be accurately regulated. The slider 27 is fitted with a packing ring 30 to prevent leakage of liquid past the set screw 28. At its opposite end the auxiliary spring 26 bears against a plunger 31, which is also cup-shaped and which has its advancing movement limited by a stop constituted by a shoulder 32 between the end of the bore 23 and the interior of the housing 25.

The bore 23 is fitted slidably with an accumulator pressure piston 33 having an axial spigot 34 arranged to engage the plunger 31, an annular packing member 35 of U-shape in cross-section serving to prevent leakage of liquid from the annular space 36 past the piston 33. The working space 36 is in permanent communication with the outlet connection 15 by way of a passage 37. At its opposite end the piston 33 is formed with a circumferential flange 38 which is arranged to butt against the shoulder between the parts 23 and 24 of the bore. The part 24 contains a pump pressure piston 39, which also has an annular packing ring 40 and an axial spigot which is indicated at 41, the extremity of the latter being adapted to bear against the end surface of the accumulator pressure piston 33. An annular working space 42 surrounding the spigot 41 is in permanent communication with the connection 14 by way of a passage 43, while a passage 44 extends downwards from the working space 42 and leads into another bore 45 formed in the body 10.

The bore 45 has its outer end closed by a plug member 46 and it contains an axially slidable piston valve member indicated generally at 47. The piston valve member 47 is urged towards the right by a coiled compression spring 48, but movement in this direction is limited by the engagement of a flange 49 with a shoulder 50. The piston valve member 47 has at its opposite end a cylindrical portion 51 which is adapted to fit into the end of the bore 45 in a liquid tight manner, as shown in Figure 1, but adjacent this portion the valve member 47 is formed with flats 52 producing corresponding spaces which are in permanent communication with a circumferential groove 53 in the valve member; this groove is, of course, also in permanent communication with the passage 44 leading to the inlet connection 14. Thus when the valve member 47 which constitutes the blow-off valve is in its closed position as shown in Figure 1, pressure liquid within the passage 44 is unable to reach the interior of the casing 11, as the bore 45 is blocked by the cylindrical portion 51. When, however, the valve member 47 moves to the right, say, to the position shown in Figure 3, the cylindrical portion 51 is wholly beyond the bore 45 and therefore pressure liquid from the passage 44 can pass through the spaces produced by the flats 52 and consequently flow back to the reservoir 12 by way of the casing 11 and the pipe 13. The valve member 47 is adapted to be held non-positively in its closed position, and for this purpose it is formed with a circumferential groove 54, which is engaged by a spring-pressed ball 55 acting as a resilient catch.

At its right-hand end the piston valve member 47 is attached by a pivot 56 to a link member 57 having a longitudinal slot 58. A pin 59, which engages this slot, is carried by a dead-center lever or arm 60 pivotally mounted at its upper end upon a spindle 61 within the casing 11, while the lower end of said lever or arm is pivoted at 62 to a telescopic spring-extended strut 63. A spigot 64 formed upon the lower end of the strut 63 is hemi-spherical in shape and is housed within a recess in the upper end of a grub screw 65 passing through the bottom of the casing 11. Thus angular movement of the strut 63 is permitted and the deflecting force exerted by said strut on the lever or arm 60 to urge the latter away from its dead-center position can be regulated by raising or lowering the grub screw 65. A lock nut 66 preserves the adjustment and a cap nut 67 is provided in order to prevent leakage of liquid from the casing 11. The deflection of the lever or arm 60 in each direction is limited by a pair of stops formed within the casing 11 and indicated at 68 and 69.

At a short distance from the spindle 61 the lever or arm 60 carries a roller 70, which is adapted to engage with one or other of a pair of shoulders 71 and 72 formed upon the pump pressure piston 39. This piston extends completely across the casing 11 and at its outer end is slidably mounted in a bore 73 formed in the end part of a housing 74 containing a main coiled compression spring 75. This spring is arranged to act upon a circular plate 76 which is passed over a spigot 77 on the piston 39 and engages a shoulder 78 on said piston. In order that the force exerted by the main spring 75 may be adjustable, the opposite end of said spring is arranged to bear against a slider 79 which is located by an adjusting set screw 80 having a lock nut 81; a packing ring 82 is provided to prevent leakage of liquid.

Figure 2:
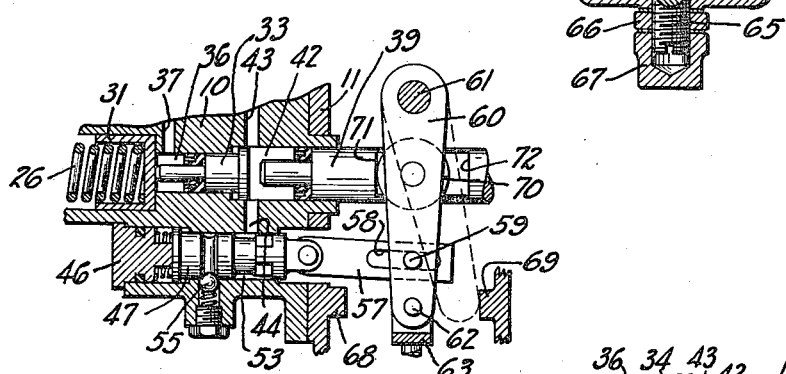
Figure 2 is a fragmentary sectional elevation showing the action of the valve device as the fluid pressure delivered to the accumulator increases.
Figure 3:
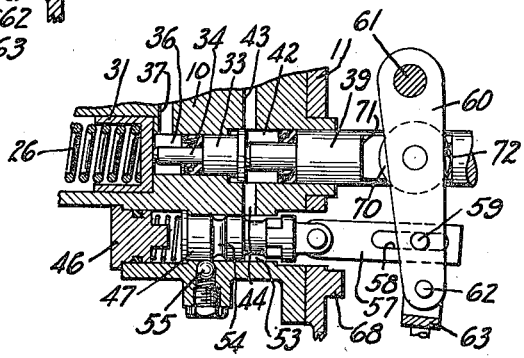
Figure 3 is a similar view showing the disposition of the parts after the blow-off valve has opened.

The action of the pressure regulating device is as follows. The force exerted by the main spring 75 is arranged to be greater than that produced by the auxiliary spring 26, so that when the fluid pressure in the accumulator 19 is sufficiently low to require replenishment the parts assume the positions shown in Figure 1. It will be seen that the main spring 75 has forced the pump pressure piston 39 as far as possible to the left, thus urging the flange 38 of the accumulator pressure piston 33 into firm contact with the shoulder between the parts 23 and 24 of the bore. Moreover, with the piston 33 in this position the spigot 34 holds the plunger 31 away from the shoulder 32 and increases the compression of the auxiliary spring 26. The lever or arm 60 is held firmly in its left-hand position by the spring-extended strut 63 and thus, in conjunction with the ball 55, holds the blow-off piston valve member 47 in its closed position. Pressure liquid delivered by the pump 16 is therefore prevented from entering the casing 11, but instead it passes through the passage 21 and, opening the ball valve 22, it flows through the pipe 18 to the accumulator 19. It will be seen that the pressure exerted by the liquid in the pipe 18 is communicated through the passage 37 and acts towards the right upon the accumulator pressure piston 33; similarly the pressure of the liquid delivered by the pump 16 is present in the annular space 42 and tends to move the pump pressure piston 39 also towards the right. It is, of course, appreciated that the pressure in the space 42 in addition acts towards the left upon the accumulator pressure piston 33 and consequently counteracts the force of the liquid in the space 36. As the pressure in the space 42 increases, due to the accumulator 19 approaching its fully charged condition, the force exerted on the piston 39, aided temporarily by the force of the auxiliary spring 26, causes the pistons 33 and 39 to be moved bodily towards the right, thus progressively compressing the main spring 75. When the plunger 31 reaches the shoulder 32 the auxiliary spring 26 is no longer able to assist this movement. Nevertheless as the pressure in the space 42 continues to rise it is able to force the piston 39 still further towards the right, thus continuing to compress the main spring 75. In the meantime the roller 70 upon the lever or arm 60 has been engaged by the shoulder 71 and said lever or arm is caused to move progressively about the spindle 61, the strut 63 being shortened until a dead-center position is reached, as is shown in Figure 2. It will be observed that during the movement so far executed the piston valve member 47 has remained stationary, owing to the ball catch 55, the pin 59 sliding freely within the slot 58. As soon as the dead-center position of the lever or arm 60 is passed, however, the strut 63, in tending to expand, rapidly moves the lever or arm 60 to its extreme right-hand position, where its lower end engages with the stop 69, as indicated by the broken lines in Figure 2. The slot 58 is of such a length that, during the final part of this movement, the pin 59 engages the right-hand end of the slot 58 and thus causes the piston valve member 47 to be moved to its right-hand position, in which the blow-off device is open. Thus the liquid which is delivered by the pump 16 can flow at low pressure through the passages 43 and 44, past the flats 52 and into the casing 11, said liquid returning to the reservoir 12 by way of the pipe 13. The non-return valve 22, of course, closes instantaneously and so prevents the escape of pressure liquid from the accumulator 19. It will be seen that the movement of the piston valve member 47 to its open position destroys substantially the whole of the liquid pressure which was acting in the annular space 42 to urge the pump pressure piston 39 towards the right, although, of course, the fluid pressure in the space 36, acting upon the smaller accumulator pressure piston 33, still remains. The accumulator pressure in the space 36 is, however, unable of itself to sustain the compression of the main spring 75, so that as the piston valve member 47 moves to its open position the main spring 75 expands, thus forcing the pump pressure piston 39 into engagement with the accumulator pressure piston 33, these two parts moving together towards the left until the spigot 34 re-engages with the plunger 31. At this point the auxiliary spring 26, which is, of course, in a partially compressed state, acts to assist the pressure fluid in the space 36, and the movement of the pistons 33 and 39 towards the left is arrested. During this rapid return movement of the pump pressure piston 39 the shoulder 72 upon the latter engages with the roller 70 and when the spigot 34 re-engages the plunger 31 the lever or arm 60 has almost reached its dead center position, as shown in Figure 3, the spring-extended strut 63 still acting to force the said lever or arm towards the right. The pin 59 has not yet reached the end of its slot 58 so that the piston valve member 47 remains in its right-hand, open position.

As the liquid stored in the accumulator 19 is used the pressure in the annular space 36 drops until it assumes a value at which the combined force of the auxiliary spring 26 and the liquid in the space 36 is unable to counteract the force of the main spring 75. At this point, therefore, the main spring 75 pushes the pump pressure piston 39 and the accumulator pressure piston 33 still further to the left, so that the plunger 31 is moved to compress the auxiliary spring 26, and the arm or lever 60 is moved over its dead-center position. The spring extended strut 63 then helps the main spring 75 to overcome the accumulator pressure and the auxiliary spring 26, the change-over of the direction of thrust of the spring extended strut providing a sufficient increase in the total thrust acting towards the left to snap the pistons 33 and 39 back to the positions shown in Fig. 1, whilst the valve 47 is returned to its closed position.

As the liquid delivered by the pump 16 can no longer escape freely to the reservoir 12 its pressure builds up, and when it becomes greater than that in the accumulator 19 the output from the pump 16 flows past the non-return valve 22 as before so as to re-charge the accumulator 19. It will be seen that when the blow-off valve member 47 is in its closed position it is in a balanced state as far as the pressure liquid in the annular space 53 is concerned; also the space 83 between the plug member 46 and the adjacent end of the valve member 47 is connected with the interior of the casing 11 by means of an axial passage 84 through said valve member.

The improved pressure regulating device is extremely adaptable and is relatively easy to adjust, for the strength of the main spring 75 approximately determines the pressure at which the pump 16 ceases to re-charge the accumulator 19, while the force exerted by the auxiliary spring 26 approximately determines the extent to which the pressure in the accumulator 19 can fall before the pump 16 is again brought into service.

It will be appreciated that the construction described is given merely as an example and that various modifications may be made in the design and arrangement of the parts so as to suit requirements. Moreover, in addition to its application to systems employing pressure accumulators, the improved regulating device may be employed in cases where a continuously driven pump delivers fluid direct to a piston and cylinder unit or like motor, the arrangement being such that when the piston or equivalent of said motor reaches the end of its stroke, the consequent rise of pressure in the supply pipe line operates the pressure regulating device and enables the delivery from the pump to escape freely, thus reducing the load on the pump to a minimum.

What we claim is:

1. In a fluid supply system comprising a pump and a pressure reservoir adapted to store fluid under pressure, a pressure regulating device comprising a blow-off valve, a fluid pressure responsive device which operates the blow-off valve through the medium of a lost motion connection, a main spring urging the fluid pressure responsive device in the valve closing direction, an auxiliary spring acting against the main spring and urging the fluid pressure responsive device in the opposite direction, said auxiliary spring acting in combination with the fluid pressure in a fluid pressure chamber in said regulating device and being so arranged that during the movement of the blow-off valve from closed to open position the auxiliary spring ceases to exert force on the fluid pressure responsive device before the latter moves the blow-off valve to its open position.

2. In a fluid supply system comprising a pump and a pressure reservoir adapted to store fluid under pressure, a pressure regulating device comprising a blow-off valve, a lever connected by a lost motion connection to the valve device and arranged to be resiliently urged away from a dead center position, a piston for bringing about movement of said lever, said piston being acted upon by the fluid pressure in a fluid pressure chamber in said regulating device, a pair of springs acting in opposition upon said piston device, and a stop limiting the range of action of one of said springs.

3. A pressure regulating device as claimed in claim 1 having a stop which engages the auxiliary spring during movement of the fluid pressure responsive device in its valve opening direction to remove from the fluid pressure responsive device the force exerted by the auxiliary spring.

4. A pressure regulating device as claimed in claim 1 having adjusting means for varying the force which is exerted by the auxiliary spring.

5. A pressure regulating device as claimed in claim 1 having an angularly movable arm connected with the fluid pressure responsive device, which arm is resiliently urged in either direction away from the center position.

6. A pressure regulating device as claimed in claim 1 having an angularly movable arm connected with the fluid pressure responsive device, said arm being resiliently urged in either direction away from the center position, and a pin and slot connection between the angularly movable arm and the blow-off valve for allowing the forementioned lost motion.

7. A pressure regulating device as claimed in claim 1 wherein the blow-off valve comprises a piston valve member and a spring loaded catch which resiliently locates the valve member in its closed position.

8. A pressure regulating device as claimed in claim 1 having a slidable cup member engaging the auxiliary spring at its free end, the central region of the cup member being arranged to cooperate with the fluid pressure responsive device, and a shoulder which engages the outer part of the cup member after a limited movement thereof in the valve opening direction to relieve the force of said auxiliary spring from the valve device.

9. A pressure regulating device as claimed in claim 1 having adjusting means for varying the force which is exerted by the auxiliary spring, and adjusting means for varying the force which is exerted by the main spring.

10. A pressure regulating device as claimed in claim 1 having means controlled by the fluid pressure responsive device for fully opening or fully closing the blow-off valve whenever said valve is actuated in one direction or the other.

11. In a fluid supply system comprising a pump and a pressure reservoir adapted to store fluid under pressure, a regulating device having a high pressure inlet conduit and a high pressure outlet conduit and a connecting conduit for diverting fluid from the high pressure inlet to the high pressure outlet when the inlet fluid pressure rises above a higher predetermined limit, comprising a blow-off valve, a piston device, trip mechanism actuating the blow-off valve in both directions at predetermined points in the stroke of the piston device, a main spring acting constantly on said piston device to urge it in the valve closing direction, and an auxiliary spring adapted to urge the piston device in the opposite direction, said auxiliary spring ceasing to act on the piston device before said trip mechanism is operated to open the valve, and re-engaging the piston device on its return stroke before the trip mechanism is operated to close the valve.

12. In a fluid supply system comprising a pump and a pressure reservoir adapted to store fluid under pressure, a regulating device having a high pressure inlet conduit and a high pressure outlet conduit and a connecting conduit for diverting fluid from the high pressure inlet to the high pressure outlet when the inlet fluid pressure rises above a higher predetermined limit, comprising a check valve in the fluid path between the high pressure inlet and outlet conduits, a blow-off valve, a piston subjected to the pressure in the high pressure inlet side of said check valve, a second piston subjected to the pressure in the high pressure outlet conduit side of said check valve, both said pistons being urged in the same direction by the respective pressures, a main spring constantly acting on said pistons to oppose the fluid pressure thereon, an auxiliary spring acting on said pistons in opposition to said main spring, and trip mechanism actuated by said pistons to open and close said valve during piston movement in opposite directions, said auxiliary spring ceasing to act on the pistons before said trip mechanism is operated to open the valve, and re-engaging the piston device on its return stroke before the trip mechanism is operated to close the valve.

13. In a fluid supply system comprising a pump and a pressure reservoir adapted to store fluid under pressure, a regulating device having a high pressure inlet conduit and a high pressure outlet conduit and a connecting conduit for diverting fluid from the high pressure inlet to the high pressure outlet when the inlet fluid pressure rises above a higher predetermined limit, comprising a check valve in the fluid path between the high pressure inlet and outlet conduits, a blow-off valve, a piston subjected to the pressure on the high pressure inlet side of the check valve, a piston of smaller area than said first piston subjected to the pressure on the high pressure outlet side of said check valve, both said pistons being urged in the same direction by the respective pressures, a main spring constantly acting on said pistons to oppose the fluid pressure thereon, an auxiliary spring adapted to at times act on said pistons in opposition to said main spring, trip mechanism actuated by said pistons to open and close said valve respectively during piston movement in opposite directions, and stop means taking the thrust of said auxiliary spring in certain positions of the pistons, the said spring engaging said stop means during the valve-opening movement of the piston before the trip mechanism is operated to open the valve, and being re-engaged by the piston device on its return stroke before the trip mechanism is operated to close the valve.

EDWARD CLAUDE SHAKESPEARE CLENCH.
QUINTIN HEALEY CARLTON.